United States Patent Office 3,091,981
Patented June 4, 1963

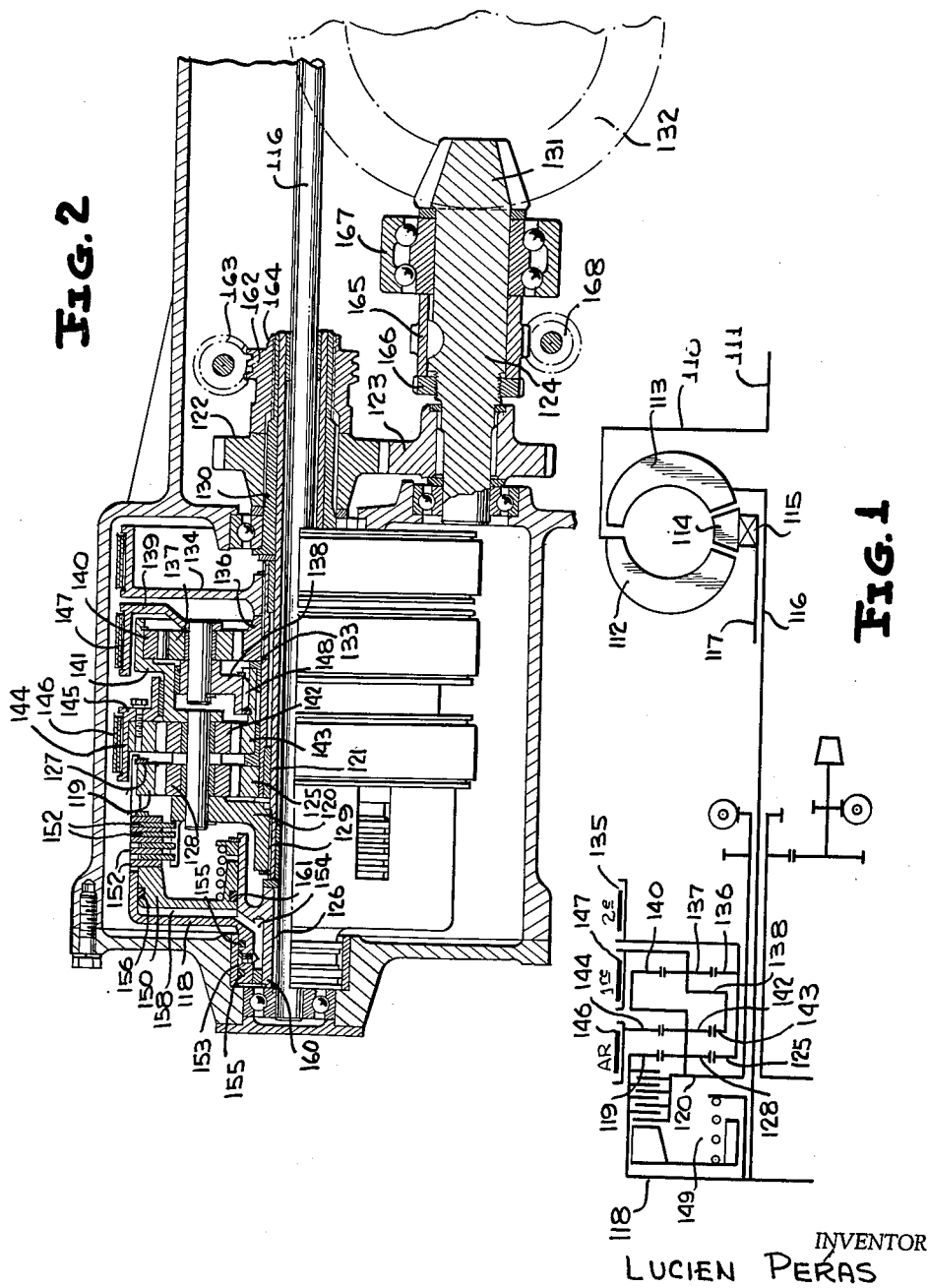

3,091,981
EPICYCLIC GEARBOXES FOR TRANSMISSION MECHANISMS
Lucien Péras, Billancourt, France, assignor to Regie Nationale des Usines Renault, Billancourt, France
Filed Dec. 14, 1960, Ser. No. 75,765
Claims priority, application France Dec. 16, 1959
8 Claims. (Cl. 74—759)

This invention relates to epicyclic gearboxes for transmission mechanisms and has specific reference to an epicyclic gearbox comprising in combination an epicyclic gear with three brake harnesses adapted to lock against motion certain elements thereof and a single clutch disposed between rotary members whereby two of these elements may be interlocked in order to provide three forward speeds and reverse, according to a specific embodiment adapted for use in a transmission mechanism, that is, in an assembly comprising, in a casing connected to the engine block of a vehicle: the gearbox, the final reduction gear and the differential, the latter being located between the engine shaft and the gearbox, according to a now conventional disposal in the case of a front-axle-drive, front-engined vehicle, or in the case of a rear-axle drive, rear-engined vehicle.

This arrangement is used preferably but not compulsorily, after a hydrokinetic torque converter interposed—from a functional point of view—between the engine shaft and the input shaft of the gearbox, and located between the engine and the casing containing the final reduction gear and the differential. It is also associated preferably with an automatic change-speed control device which is no part of this invention and may be of any known type, the function of this device consisting, according to the condition of operation of the vehicle, in actuating the brake harnesses or the clutch to provide the required and adequate transmission ratio.

In the drawing:

FIGURES 1 and 2 show respectively the general diagram and a longitudinal axial section of a form of embodiment of the mechanism according to this invention wherein three identical simple epicyclic gear trains are used, with two planet carriers, the output end of the mechanism comprising a reversing gear driving the bevel pinion.

Referring to FIG. 1, it will be seen that the transmission comprises a conventional torque converter having its impeller 112 driven through a plate 110 from the shaft of an explosion or internal combustion engine (not shown). The turbine 113 of the converter is connected through a shaft 116 to the epicyclic gearbox. The reaction member 114 is connected to the casing through a freewheel 115 and a shaft 117. The shaft 116 (FIG. 2) extends axially through the gearbox and drives through splines 126 the clutch casing 118 and the internally toothed annulus 119 of the first epicyclic gear train. This annulus is drivingly connected by means of notches to the clutch casing 118 and retained by a circlip 127. The input annulus 119 of the epicyclic gear train is in meshing engagement with planet wheels such as 128 mounted on the planet carrier 120. This planet carrier 120 is secured through splines 129 on the output shaft 121. This shaft 121 drives through the medium of a tubular shaft 130 force fitted thereon the pinion 122 driven through splines from the tubular shaft 130. This pinion 122 is in meshing engagement with the pinion 123 mounted through splines on the shaft 124 carrying the bevel pinion 131 meshing with the crown wheel 132 of the differential. The planet wheels 128 also mesh with the sun gear 125 mounted through splines on shaft 133. Furthermore, this shaft 133 also carries on the one hand another pinion 136 and on the other hand a drum 134 adapted to be held against rotation by a brake band 135. The pinion 136 is the sun gear of a simple epicyclic gear train comprising planet wheels such as 137 and an internally toothed annulus 140.

The last-named internally toothed annulus 140 is secured on a carrier 141 rigid in turn with the planet carrier 120 constituting the output member as already explained. The planet wheels 137 are mounted on a planet carrier 138. A brake drum 139 secured on the planet carrier 138 permits of holding the latter against rotation by tightening a brake band 147. Finally, the planet carrier 138 is connected through splines 148 to a pinion 143 constituting the sun gear of a third epicyclic gear train. The sun gear 143 is in constant meshing engagement with planet wheels such as 142 mounted on the planet carrier 120 already carrying the planet wheels 128; an internally toothed annulus 144 secured on a brake drum 145 meshes with these planet wheels 142, as shown. The brake drum 145 centered on the planet carrier 120 is adapted to be held against rotation by a brake harness 146. A clutch 149, consisting of the bell-shaped member or casing 118 secured through splines 126 on the input shaft 116, of driving disks 151 driven in turn from the casing 118, and of driven disks 152 driving in turn the planet carrier 120 through notches, is provided for causing the input shaft 116 and output shaft 121 to revolve as one solid unit. To this end, oil under pressure is fed to the circular groove 153 connected through a duct 154 to an oil-tight chamber 158 provided in the bell-shaped clutch casing 118.

A pair of shaft packings 155 are provided to seal the clutch hub 160 from the bearing 159 on either side of the circular groove 153; the pressure obtaining in chamber 158 urges the piston 150 provided with piston packings 156 and 161 to the right (FIG. 2), thus clamping the clutch disks 151 and 152 together and causing the clutch engagement.

This piston 150 is returned by a coil spring to its clutch-release position when the oil pressure is removed from chamber 158. The governor controlling automatically the gear changes, which is no part of this invention and is not shown in the drawings, as well as possibly other auxiliary apparatus also not shown, is driven from a worm gear 163 meshing with the worm 162 rigid with the output shaft 121 by being screwed on the tubular shaft 130 so as to lock the pinion 122 in position. The end collar 164 of worm 162 is flanged on the tubular shaft end to prevent any loosening of the worm therefrom.

The shaft 124 carrying the driving bevel pinion 131 drives through a worm 165 the worm gear 168 rotatably solid with the speedometer cable. A nut 166 locks the worm 165 and ball bearing 167 on shaft 124.

In general, it may be noted that the gearbox consists of three simple combined epicyclic gear trains which may be identical, as shown in FIG. 2. For example, the sun gear may have 24 teeth, the planet wheels 15 and the toothed annulus 54 teeth. The epicyclic gear trains have a common planet carrier.

This assembly operates as follows:

The gearbox illustrated in FIG. 2 provides three forward speeds and reverse; in each case the drive occurs through the torque converter. There is also a neutral position in which no drive occurs.

(1) *Neutral.*—In the neutral position the three brake harnesses 135, 146 and 147 are released and clutch 149 is disengaged. The turbine drives the annulus 119 through the medium of shaft 116 and bell-shaped casing 118. The vehicle equipped with the gearbox mechanism is stationary, and therefore the planet carrier 120 mechanically connected to the driving wheels of the vehicle is also stationary. The planet wheels 128 revolve about themselves, thus rotatably driving in a direction opposite to the engine direction of rotation the planet wheels 125 and 136, this drive being possible as the brake harness 135 is released.

As the internally toothed annulus 140 is solid with the planet carrier 120, it is also stationary and as the brake harness 147 is released the planet carrier 138 is driven from the sun gear 136 and revolves in the direction of rotation opposite to the engine rotation, thus driving the sun gear 143 in the same direction. This sun gear 143 drives in turn through the planet wheels 142 the annulus 144 in the engine direction of rotation, since the brake harness 146 is released.

Thus, all the component elements will revolve freely and the planet carrier 120 will not receive any driving torque.

(2) *First gear.*—The change from neutral to first gear is obtained by tightening the band brake 147. The planet carrier 138 is locked. The internally-toothed annulus 119 drives the planet carrier 120 with a torque C1 giving a torque C2 in a direction opposite to the direction of rotation of the engine in the sun gear 125; the latter will thus drive through shaft 133 the sun gear 136. As the planet carrier 138 is locked against rotation, the sun gear 136 responsive to the torque C2 transmits to the internal-toothed annulus 140 a torque C3 and to the planet carrier 138 a reaction torque C4 of a direction opposite to that of the engine torque, thus providing the first-gear reaction torque. The torque transmitted to the output element is then $C1+C3$. With the number of teeth indicated by way of example hereinabove this torque is 2.44 times the input torque.

(3) *Second gear.*—When the transmission is in first gear the change to second gear is effected by releasing brake band 147 and tightening brake band 135, thus locking shaft 133 and notably sun gear 125. Thus the torque is transmitted via the annulus 119 driving the planet carrier 120 through planet wheels 128 reacting on the stationary sun gear 125. With the number of teeth given hereinabove the torque multiplication is 1.44 times the input torque.

(4) *Third or top gear.*—In third gear all the elements revolve as one solid unit. To this end the brake harness 135 is released and clutch 149 engaged by directing oil under pressure into the groove 153 feeding the chamber 158 so as to apply a sufficient axial thrust through the piston 150 to the clutch disks 151 and 152. The shaft 116 will thus drive directly the gearbox output shaft 121, as well as pinions 122 and 123 and therefore the layshaft 124 carrying the driving bevel pinion 131.

(5) *Reverse.*—Reverse is obtained by tightening the brake harness 146 to lock the annulus 144. The torque is transmitted through a path slightly more complicated than in first gear. In fact, the engine torque is applied to the internally toothed annulus 119 tending to drive the planet carrier 120 forwards with a torque C1, the sun gear 125 being responsive to a torque of a direction opposite to that of the engine torque, which torque is equal to C2 and transmitted to the sun gear 136; this torque C2 originates a torque C3 (in a direction opposite to that of the engine torque) in planet carrier 138 and a torque C4 (in the direction of the engine torque) in annulus 140, this torque C4 being applied to the output planet carrier 120. The torque C3 is applied to the sun wheel 143 and the latter produces in turn a torque C5 opposite to the engine torque which is transmitted to the planet carrier 120, the annulus 144 being subjected to a torque directed in the same direction as the engine torque. To sum up, the planet carrier 120 is responsive to torques $C1+C4-C5$. Considering a mechanism having the numbers of teeth proposed hereinabove, the output torque opposite to the direction of the engine torque is 2.25 times the input torque.

The various forward gears (first gear, second gear and third or top gear) and the change from one gear to another may be obtained through manual or automatic control means.

What is claimed is:

1. Epicyclic gearbox with coaxial input and output shafts disposed on the same side of the gearbox, for vehicles comprising a transmission wherein the gearbox proper is on the side opposite to the engine in relation to the final reduction gearing and the differential, said gearbox comprising a first planetary gear train, a second planetary gear train, a third planetary gear train, a first brake means connected to the second gear train for providing the reverse drive, a second brake means for yielding the first speed ratio drive, a third brake means for yielding the second speed ratio drive, said brake means each having a rotatable element, a single clutch means for yielding the direct drive and having a driven element and a driving element, said first and second planetary gear trains having a common planet-carrier coupled to said output shaft, to the annulus gear of said third planetary gear train and to the driven element of said clutch means, the driving element of which is coupled to said input shaft and to the annulus gear of said first planetary gear train, the sun gear of the latter being coupled by a common shaft to the sun gear of said third planetary gear train and to the rotatable element of said third brake means, and the planet-carrier of said third planetary gear train being coupled to the rotatable element of said second brake means and, by a common shaft, to the sun gear of said second planetary gear train, the annulus gear of which is coupled to the rotatable element of said first brake means.

2. Epicyclic gearbox according to claim 1, in which a hydrodynamic torque converter is interposed between said input shaft and said engine.

3. Epicyclic gearbox according to claim 1, in which said final reduction gearing comprises a bevel pinion and in which said output shaft is formed as a sleeve shaft in which said input shaft is drivingly and concentrically mounted, a pinion drivingly connected to said output shaft meshing with another pinion drivingly connected to said bevel pinion.

4. Epicyclic gearbox according to claim 1, in which said final reduction gearing comprises a bevel pinion and in which said output shaft is formed as a sleeve shaft in which said input shaft is drivingly and concentrically mounted, said bevel pinion being drivingly connected to said sleeve shaft.

5. Epicyclic gearbox according to claim 1, in which said clutch means is a pressure operated friction disc clutch comprising an annular casing secured to said input shaft and to the driving discs of said clutch, an annular piston sliding in said casing to selectively couple said driving discs to the driven discs secured to said planet-carrier of said first and second planetary gear trains, an input for the control fluid of said clutch being provided in said casing.

6. Epicyclic gearbox according to claim 1, in which said brake means are band brakes the drums of which form said rotatable elements, the bands of said band brakes being adapted to selectively arrest rotation of said drums.

7. Epicyclic gearbox according to claim 1, wherein the gears of each planetary gear train are constituted by one sun gear, planet wheels and one internal annulus gear.

8. Epicyclic gearbox according to claim 1, wherein said first, second and third planetary gear trains are identical with respect to the teeth numbers.

References Cited in the file of this patent

UNITED STATES PATENTS

| | | |
|---|---|---|
| 2,123,769 | Cotal | July 12, 1938 |
| 2,127,655 | Stromquist et al. | Aug. 23, 1938 |
| 2,580,656 | Clerk | Jan. 1, 1952 |
| 2,616,310 | Jandasek | Nov. 4, 1952 |
| 2,800,036 | Miller | July 23, 1957 |
| 2,886,984 | Whelpley | May 19, 1959 |
| 2,959,985 | Moore | Nov. 15, 1960 |
| 3,025,721 | De Lorean | Mar. 20, 1962 |

FOREIGN PATENTS

| | | |
|---|---|---|
| 996,958 | France | Sept. 5, 1951 |
| 1,054,853 | Germany | Apr. 9, 1959 |